(12) United States Patent
Inoue et al.

(10) Patent No.: US 8,140,912 B2
(45) Date of Patent: Mar. 20, 2012

(54) SEMICONDUCTOR INTEGRATED CIRCUITS AND METHOD OF DETECTING FAULTS OF PROCESSORS

(75) Inventors: Hiroaki Inoue, Tokyo (JP); Masamichi Takagi, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 12/447,512

(22) PCT Filed: Oct. 19, 2007

(86) PCT No.: PCT/JP2007/070465
§ 371 (c)(1),
(2), (4) Date: Dec. 9, 2009

(87) PCT Pub. No.: WO2008/053723
PCT Pub. Date: May 8, 2008

(65) Prior Publication Data
US 2010/0153784 A1    Jun. 17, 2010

(30) Foreign Application Priority Data
Nov. 2, 2006    (JP) .................................. 2006-299090

(51) Int. Cl.
*G06F 11/00*    (2006.01)
(52) U.S. Cl. ................. 714/45; 714/10; 714/34; 714/37
(58) Field of Classification Search .................... 714/10, 714/34, 37, 45
See application file for complete search history.

(56) References Cited

U.S. PATENT DOCUMENTS

| | | | | |
|---|---|---|---|---|
| 3,533,065 A | * | 10/1970 | Boehner et al. | 714/16 |
| 5,241,547 A | * | 8/1993 | Kim | 714/53 |
| 5,668,947 A | * | 9/1997 | Batcher | 714/30 |
| 5,905,855 A | * | 5/1999 | Klaiber et al. | 714/31 |
| 5,956,476 A | * | 9/1999 | Ranson et al. | 714/30 |
| 6,073,267 A | * | 6/2000 | Sasaki | 714/799 |
| 6,633,973 B1 | * | 10/2003 | Kanzaki | 712/227 |
| 6,785,842 B2 | * | 8/2004 | Zumkehr et al. | 714/17 |
| 7,065,680 B2 | * | 6/2006 | Mantyla | 714/49 |
| 7,093,239 B1 | * | 8/2006 | van der Made | 717/135 |
| 7,155,590 B2 | * | 12/2006 | Mathis | 711/164 |
| 7,681,107 B2 | * | 3/2010 | Muranushi et al. | 714/766 |
| 7,711,990 B1 | * | 5/2010 | Nickolls et al. | 714/37 |
| 2008/0034264 A1 | * | 2/2008 | Kaabouch et al. | 714/732 |

FOREIGN PATENT DOCUMENTS

| | | |
|---|---|---|
| JP | 1983090252 A | 5/1983 |
| JP | 1992248632 A | 9/1992 |
| JP | 1994161798 A | 6/1994 |
| JP | 1994350037 A | 12/1994 |
| JP | 1999219304 A | 8/1999 |
| JP | 2001273136 A | 10/2001 |
| JP | 2003256232 A | 9/2003 |
| JP | 2005149496 A | 6/2005 |
| JP | 2006012066 A | 1/2006 |
| WO | 2004077294 A1 | 9/2004 |

OTHER PUBLICATIONS

International Search Report for PCT/JP2007/070465 mailed Dec. 4, 2007.

* cited by examiner

*Primary Examiner* — Marc Duncan

(57) ABSTRACT

A semiconductor integrated circuit comprising a processor having an output signal of instruction log information and being operable in a program in memory is disclosed. The semiconductor integrated circuit comprises trace determination circuit for comparing an instruction code that corresponds to the instruction log information from a processor with an instruction code that is read from the memory to detect faults.

7 Claims, 3 Drawing Sheets

Fig.4 one instruction trace=one packet

| n bits | n bits | n bits |
|---|---|---|
| instruction code | address | data |

Fig.5

| type of instruction | address | data |
|---|---|---|
| conditional non-execution | × | × |
| simple execution | × | × |
| address output execution | ○ | × |
| data output execution | × | ○ |
| address and data output execution | ○ | ○ |
| branching | ○ | × |
| continuation | × | × |
| wait | × | × |

⎵ k bits  ⎵ m bits  m bits one instruction trace = plural packets

| k bits | m bits |
|---|---|
| type | data/address |
| type | data/address |
| ... | |
| type | data/address |

Fig.6

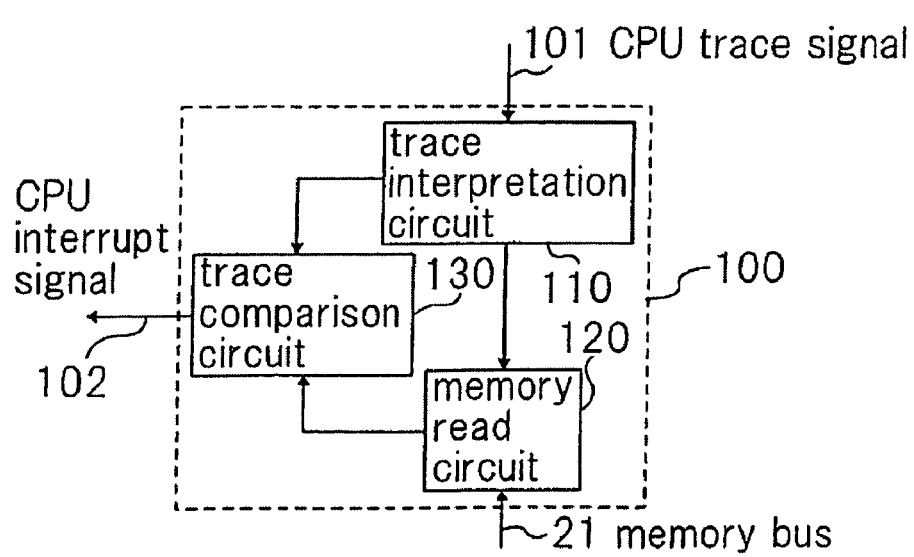

SEMICONDUCTOR INTEGRATED CIRCUITS
AND METHOD OF DETECTING FAULTS OF
PROCESSORS

This application is the National Phase of PCT/JP2007/070465, filed Oct. 19, 2007, which is based upon and claims the benefit of priority from Japanese patent application No. 2006-299090 filed on Nov. 2, 2006, the disclosure of which is incorporated herein in its entirety by reference.

TECHNICAL FIELD

The present invention relates to a temporary-fault tolerant device and method which are inexpensively capable of taking measures against temporary faults such as software errors in a semiconductor integrated circuit, in particular, in a CPU.

BACKGROUND ART

Due to the progress of miniaturization of semiconductors, it is anticipated that temporary faults such as software errors will frequently occur.

FIG. 1 diametrically illustrates an example of the configuration of a temporary-fault tolerant device in which measures have been taken against temporary faults using circuits. The example shown in FIG. 1 has a configuration wherein a flip-flop circuit within CPU 11 is replaced with temporary-fault tolerant flip-flop circuit 200. Temporary-fault tolerant flip-flop circuit 200 has a circuit design that prevents the occurrence of temporary faults. Thus, CPU 11 can take measures against temporary faults on a circuit basis.

However, the system shown in FIG. 1 presents the problem that since the area of the temporary-fault tolerant flip-flop circuit is very large as compared with the area of a conventional flip-flop circuit, the area of CPU 11 will be remarkably increased.

As a technique to address this problem, Patent literature 1 discloses a flip-flop circuit that is constructed from a bipolar-type semiconductor. Specifically, Patent literature 1 discloses a circuit wherein a software error protection resistor is inserted within the flip-flop circuit constructed from a bipolar-type semiconductor. Consequently, Patent literature 1 suffers from the same problem as in the system shown in FIG. 1.

FIG. 2 illustrates an exemplary configuration to cope with temporary faults by making use of plural processing. In the example shown in FIG. 2, precedent thread 13 and succeeding thread 14 are generated and the results of execution of the threads are compared with each other in thread-parallel type CPU 12 for the detection of temporary faults. By again executing the threads, the example shown in FIG. 2 copes with temporary faults. Thus, temporary faults can be coped with, without increasing the circuit area so much.

However, the system shown in FIG. 2 necessitates use of the thread-parallel type CPU, and utilizes the thread-parallel processing to detect temporary faults. As a result, the system is unable to realize the original performance that the CPU delivers. Further, since plural threads are executed, the amount of usage of the memory is increased.

As a technique to address this problem, Patent literature 2 discloses a CPU technique to support the execution of the plural threads. Consequently, Patent literature 2 suffers from the same problem as in the system shown in FIG. 2.

Patent literature 1: JPH6-350037A
Patent literature 2: JP2005-149496A

DISCLOSURE OF THE INVENTION

Problems to be Solved by the Invention

As discussed hereinabove, it is impossible to realize measures against temporary faults in a CPU while curbing costs.

Accordingly, it is an object to provide a semiconductor integrated circuit, a method of detecting faults in a processor and a computer program product which constitutes inexpensive fault tolerance measures that can be taken to address temporary faults which occur in a CPU.

Means to Solve the Problems

A semiconductor integrated circuit according to the present invention comprising a processor having an output signal indicative of instruction log information and being operable in a program in a memory includes trace determination means for comparing an instruction code that corresponds to the instruction log information from the processor with an instruction code that is read from the memory to thereby detect faults.

According to the present invention, when a temporary-fault in the CPU occurs, an instruction code corresponding to the instruction log information from the CPU is compared with an instruction code that is read from the memory, so that an inexpensive fault tolerance measures that can be taken to address temporary faults which occur in a CPU can be realized.

Further, by applying the present invention to a screening test before shipment, it is also possible to perform a high speed, inexpensive and high coverage screening test at the actual speed at which a program runs in the CPU. That is, by comparing the result of execution in the CPU from a relatively long signal path with the instruction read from the memory via a relatively short signal path, overhead of hardware can be suppressed.

BRIEF DESCRIPTION OF THE DRAWINGS

FIG. 4 is a diagram illustrating the configuration of trace information.

FIG. 5 is a diagram illustrating the variant of the configuration of trace information.

FIG. 6 is a diagram illustrating the configuration of a trace determination circuit.

EXPLANATION OF THE SYMBOLS

Figure 1:
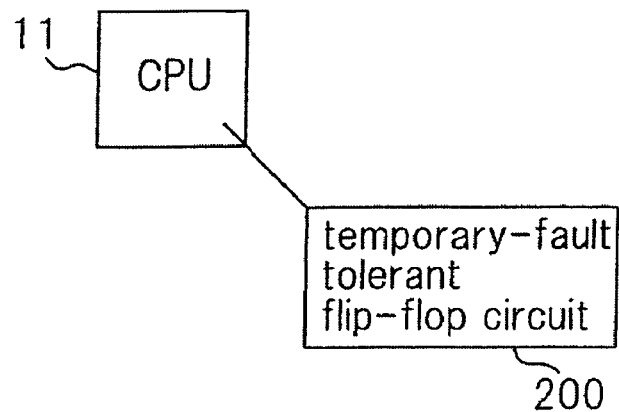
FIG. 1 is a diagram illustrating an example of the configuration of a conventional system.
Figure 2:
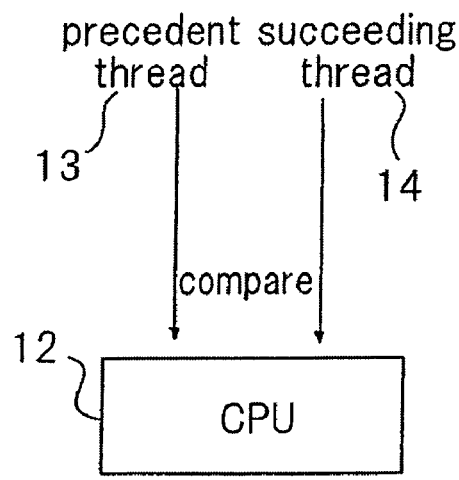
FIG. 2 is a diagram illustrating another example of the configuration of a conventional system.

10 CPU
11 temporary-fault tolerant CPU
12 thread-parallel type CPU
13 precedent thread 14 succeeding thread
20 memory
21 memory bus
100 trace determination circuit
101 CPU trace signal
102 CPU interrupt signal
110 trace interpretation circuit
120 memory read circuit
130 trace comparison circuit
200 temporary-fault tolerant flip-flop circuit

BEST MODE FOR CARRYING OUT THE INVENTION

A best mode for carrying out the invention will now be described with reference to the drawings.

Figure 3:
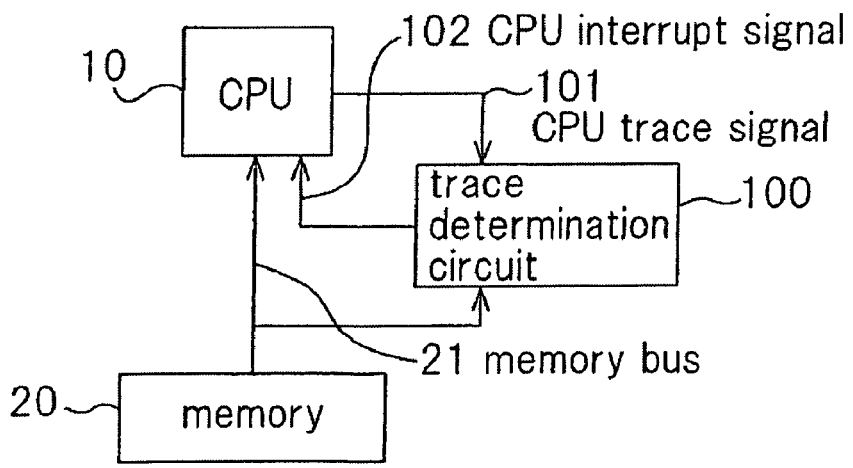
FIG. 3 is a diagram illustrating the configuration of a semiconductor integrated circuit according to an exemplary embodiment of the present invention.

FIG. 3 is a diagram illustrating the configuration of a temporary-fault tolerant device according to an exemplary embodiment of the present invention. As shown in FIG. 3, the temporary-fault tolerant device comprises; CPU 10 which is a processor; memory 20; and trace determination circuit 100 which is connected with CPU 10 through CPU trace signal 101 and with memory 20 which stores data and programs, through memory bus 21. Trace determination circuit 10 compares an instruction code corresponding to the execution log information (trace information) of CPU 10 with an instruction read from memory 20 to thereby detect temporary faults and informs CPU 10 of the detection through CPU interrupt signal 102 to thereby take measures against the temporary faults.

In the exemplary embodiment, CPU 10, memory 20 and trace determination circuit 100 each may have not only a separate package configuration, but also a circuit configuration within a SoC (System-on-Chip), a SiP (System-in-Package) configuration or a combination thereof.

CPU 10 may be any programmable processors such as a signal processing processor, a VLIW processor, a configurable processor and the like. The CPU has trace signal 101 which is able to obtain the result of execution as trace information, and has CPU interrupt signal 102 for the reception of an interrupt. Further, in order to strictly maintain the flow of instruction control, temporary-fault tolerant measures may be taken against program counting.

Trace determination circuit 100 may be implemented not only in hardware but also in software.

Furthermore, memory 20 may have a multi-chip configuration or a multi-bank configuration, provided that it is cost-competitive. Moreover, a temporary-fault tolerance measure such as an error correction code may be provided in memory 20.

FIG. 4 illustrates an example of the configuration of trace information in the present exemplary embodiment. In this example, the trace information is such that one piece of instruction trace information is, in principle, represented by one packet. For example, one packet contains n bits that represent an instruction code itself, n bits that represent an address itself and n bits that represent data itself, regarding an instruction that has been executed. When a plurality of memory accesses are executed by one instruction, one packet is output for each memory access.

FIG. 5 illustrates a variant of the configuration of trace information in the exemplary embodiment. In this example, unlike the example shown in FIG. 4, one piece of instruction trace information is represented by a plurality of packets, thus resulting in a reduction in the hardware cost. For example, one packet contains k bits that represent the type of the instruction, m bits that represent part of the address, and m bits that represent part of the data, regarding the instruction that has been executed. Here, the type of trace comprises: "conditional non-execution" that represents that the executed instruction was not conditionally executed; "simple execution" representative of a normal execution; "address output execution" that represents that an address output was carried out; "data output execution" that represents that a data output was carried out; "address and data output execution" that represents that an address and data output was carried out; and "branching" that represents that branching was carried out. The type of trace further comprises: "continuation" that represents continuation information of the prior packet; and "wait" that represents that the execution of the instruction is in a wait state.

FIG. 6 illustrates an example of the configuration of trace determination circuit 100. Trace determination circuit 100 comprises: trace interpretation circuit 110 connected with CPU 10 through CPU trace signal 101 and having the function to compare an instruction code corresponding to the instruction log information executed in CPU 10 with an original instruction code stored in memory 20 and to interrupt CPU 10; memory read circuit 120 connected with memory 20 through memory bus 21; and trace comparison circuit 130 connected with CPU 10 through CPU interrupt signal 102.

Trace interpretation circuit 110 interprets trace information from CPU trace signal 101, and converts the trace information into an instruction string (instruction codes) that was actually executed. The converted instruction string is notified to memory read circuit 120 and to trace comparison circuit 130. Trace interpretation circuit 110 may be internally equipped with a buffer to store the instruction string.

Upon receipt of the notification from trace interpretation circuit 110, memory read circuit 120 reads an instruction from memory 20 that corresponds to the instruction that is executed. The read instruction is supplied to trace comparison circuit 130. Memory read circuit 120 may have the function to read plural instructions in advance, such as prefetch. Further, when CPU 10 has a virtual address, information that is necessary for the conversion of the virtual address can be set from CPU 10.

Trace comparison circuit 130 compares an instruction code from trace interpretation circuit 110 with an instruction code from memory read circuit 120. If an inconsistency occurs, then trace comparison circuit 130 informs CPU 10 accordingly through CPU interrupt signal 102. Here, for example, by again performing processing that has caused a temporary fault, it is possible to take measures against a temporary fault.

Figure 7:
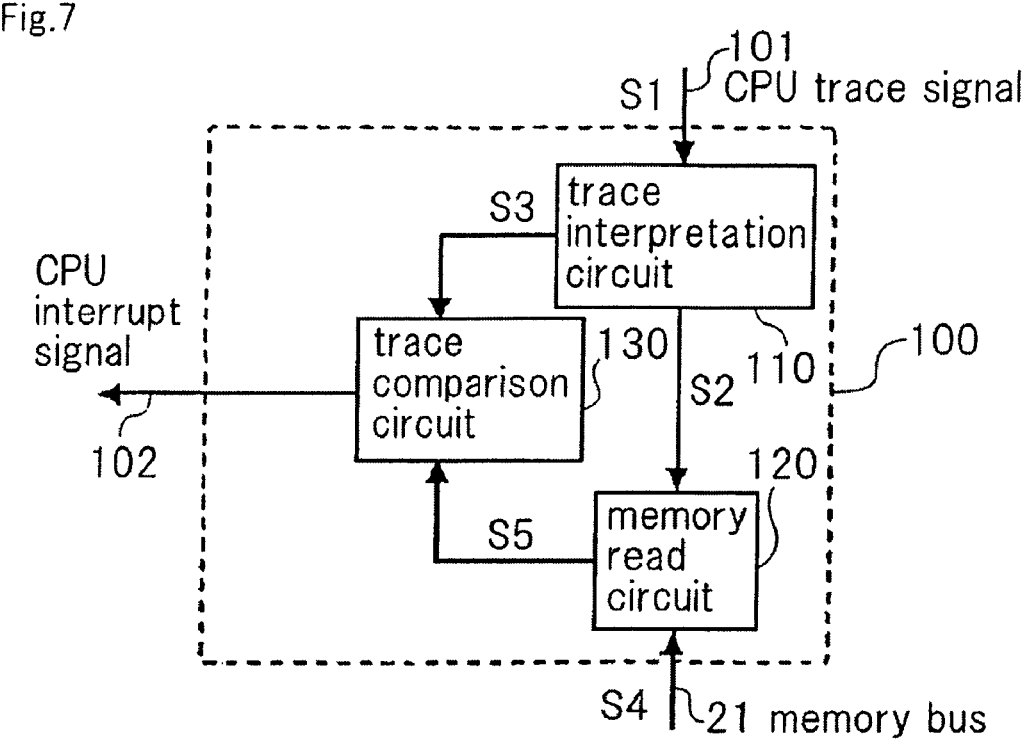
FIG. 7 is a diagram illustrating an example of the operation of a trace determination circuit.

FIG. 7 illustrates an example of the operation of trace determination circuit 100 shown in FIG. 6. In FIG. 7, the symbol at the side of an arrow that consists of "S" and a figure represents a step number.

Trace interpretation circuit 110 interprets the trace information that is received through CPU trace signal 101 (step S1). Trace interpretation circuit 110 informs memory read circuit 120 of the instruction address that corresponds to the trace information (step S2). Trace interpretation circuit 110 informs trace comparison circuit 130 of the instruction code that has been executed (step S3). Here, trace comparison circuit 130 waits for a notification from memory read circuit 120. Memory read circuit 120 reads an instruction code from memory 20 that corresponds to the instruction address that is supplied at step S2 (step S4). Memory read circuit 120 informs trace comparison circuit 130 of the instruction code that was read at step S4 (step S5). Trace comparison circuit 130 compares the instruction code with the instruction code that was obtained at step S3, and recognizes that both instruction codes coincide with each other. In this case, no further operations are performed.

Figure 8:
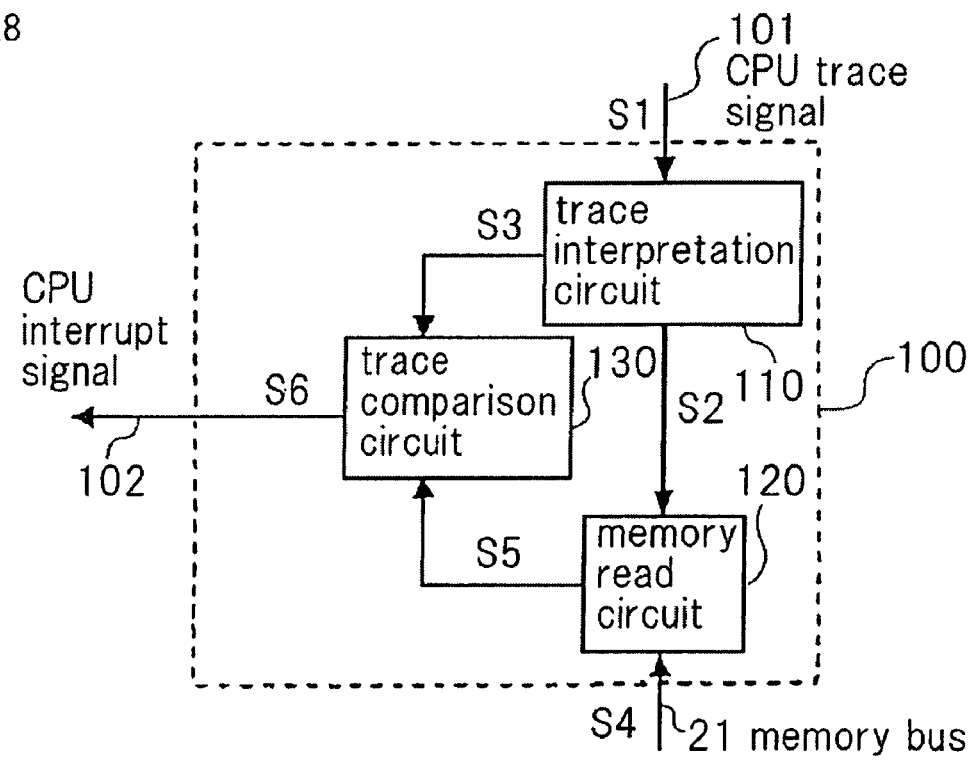
FIG. 8 is a diagram illustrating another example of the operation of a trace determination circuit.

FIG. 8 illustrates another example of the operation of trace determination circuit 100 shown in FIG. 6. In FIG. 8, the symbol at the side of an arrow that consists of "S" and a figure represents a step number.

Trace interpretation circuit 110 interprets the trace information that is received through CPU trace signal 101 (step S1). Trace interpretation circuit 110 informs memory read circuit 120 of the instruction address that corresponds to the trace information (step S2). Trace interpretation circuit 110 informs trace comparison circuit 130 of the instruction code that has been executed (step S3). Here, trace comparison circuit 130 waits for a notification from memory read circuit 120. Memory read circuit 120 reads an instruction code from memory 20 that corresponds to the instruction address that is supplied at step S2 (step S4). Memory read circuit 120 informs trace comparison circuit 130 of the instruction code that was read at step S4 (step S5). Trace comparison circuit 130 compares the instruction code with the instruction code that was obtained at step S3, and recognizes that both instruction codes do not coincide with each other (step S5). Trace comparison circuit 130 requests CPU 10 to re-execute the processing through CPU interrupt signal 102 (step S6).

In the aforementioned embodiments, the present invention has been explained by using a device and method for conducting a screening test of a semiconductor integrated circuit as an example. However, the present invention is not limited to such a device and method for conducting a screening test of a semiconductor integrated circuit, but may be applicable to any screening test devices and methods.

According to the present exemplary embodiment, when a temporary fault occurs in CPU 10, an instruction code corresponding to the instruction log information from CPU 10 is compared with an instruction code that is read from memory 20, so that inexpensive fault tolerance measures can be taken against temporary faults that occur in a CPU.

Further, by applying the present exemplary embodiment to a screening test before shipment, it is also possible to perform a high speed, inexpensive and high coverage screening test at the actual speed at which a program runs in the CPU.

The functions of the semiconductor integrated circuits as explained hereinabove may be carried out by recording a program for performing the functions of the processing operation in a computer-readable recording medium, and then reading the program thus recorded into a computer. The computer-readable recording medium may refer to a recording medium such as a flexible disk, a CD-ROM, or the like, or a recording medium such as a hard disk drive incorporated in a computer system. The computer-readable recording medium may also refer to a medium for dynamically holding a computer program for a short period of time, e.g., a transmission medium or a transmission wave, for use in applications for transmitting the program through the Internet, or a medium for holding the program for a certain period of time, e.g., a volatile memory in a computer system which operates as a server in such an application.

While preferred exemplary embodiments of the present invention have been described using specific terms, such description is for illustrative purposes only, and it is to be understood that changes and variations may be made without departing from the spirit or scope of the following claims.

The invention claimed is:

1. A semiconductor integrated circuit comprising:
a memory storing a program the includes instruction codes;
a processor executing the program and having an output signal indicative of instruction log information that represents a first instruction code that corresponds to the program that has been executed; and
trace determination means for comparing the first instruction code with a second instruction code that is read from said memory when said processor executes the program to thereby detect faults.

2. The semiconductor integrated circuit according to claim 1, wherein said trace determination means interrupts said processor which then performs processing once again.

3. The semiconductor integrated circuit according to claim 1, wherein said trace determination means includes:
trace interpretation means for interpreting the instruction log information from said processor;
memory read means for reading an instruction code of an instruction address from said memory that corresponds to the instruction log information; and
trace comparison means for comparing an instruction code that corresponds to the instruction log information with the instruction code of the instruction address.

4. The semiconductor integrated circuit according to claim 3, wherein said trace comparison means interrupts said processor which then performs processing once again.

5. A method of detecting faults of a processor executing a program that includes instruction codes, the method comprising:
extracting instruction log information that represents a first instruction code that corresponds to the program that has been executed;
extracting the first instruction code from a memory that stores instruction codes of said processor; and
comparing the first instruction code with a second instruction code that is read from said memory when said processor executes the program to detect faults.

6. A computer program product for causing a computer to detect faults of a processor executing a program that includes instruction codes, said computer program product comprising:
software instructions for causing said computer to perform a predetermined procedure; and
a non-transitory computer-readable medium for recording therein said software instructions, said predetermined procedure including the steps of:
extracting instruction log information that represents a first instruction code that corresponds to the program that has been executed;
extracting the first instruction code from a memory that stores instruction codes of said processor; and
comparing the first instruction code with a second instruction code that is read from said memory when said processor executes the program to detect faults.

7. A semiconductor integrated circuit comprising:
a memory storing a program the includes instruction codes;
a processor executing the program and having an output signal indicative of instruction log information that represents a first instruction code and an address that corresponds to the program that has been executed; and
trace determination means for comparing the first instruction code with a second instruction code that is read from said memory at the address to thereby detect faults.

* * * * *